United States Patent
Bieselt et al.

(10) Patent No.: US 9,084,021 B2
(45) Date of Patent: Jul. 14, 2015

(54) CALL-IN PARTICIPATION FOR A LIVE VIDEO BROADCAST

(71) Applicants: Jan-Christoph Bieselt, Köln (DE); Andreas Jacobi, Köln (DE)

(72) Inventors: Jan-Christoph Bieselt, Köln (DE); Andreas Jacobi, Köln (DE)

(*) Notice: Subject to any disclaimer, the term of this patent is extended or adjusted under 35 U.S.C. 154(b) by 60 days.

(21) Appl. No.: 13/711,927

(22) Filed: Dec. 12, 2012

(65) Prior Publication Data
US 2014/0160223 A1  Jun. 12, 2014

(51) Int. Cl.
*H04N 7/14* (2006.01)
*H04N 21/4782* (2011.01)
*H04N 21/4788* (2011.01)
*H04N 21/234* (2011.01)
*H04N 21/2665* (2011.01)

(52) U.S. Cl.
CPC ..... *H04N 21/4782* (2013.01); *H04N 21/23412* (2013.01); *H04N 21/2665* (2013.01); *H04N 21/4788* (2013.01)

(58) Field of Classification Search
CPC .......... H04N 21/2187; H04M 3/42221; H04H 60/58; G06F 15/16
USPC ............ 348/14.03, 207.1, 14.08; 375/240.02; 386/223, 241; 463/25, 31, 33; 704/266, 704/270; 705/14.58, 26.2, 26.3; 709/203, 709/217, 231, 229; 725/14, 25, 61, 135, 80; 379/88.04; 713/300
See application file for complete search history.

(56) References Cited

U.S. PATENT DOCUMENTS

| | | | | |
|---|---|---|---|---|
| 6,970,915 | B1* | 11/2005 | Partovi et al. | 709/217 |
| 7,308,408 | B1* | 12/2007 | Stifelman et al. | 704/266 |
| 7,310,808 | B2* | 12/2007 | Kou | 725/80 |
| 7,522,711 | B1* | 4/2009 | Stein et al. | 379/88.04 |
| 7,546,373 | B2* | 6/2009 | Lehew et al. | 709/229 |
| 7,552,054 | B1* | 6/2009 | Stifelman et al. | 704/270 |
| 8,046,432 | B2* | 10/2011 | Yoo et al. | 709/217 |
| 8,175,921 | B1* | 5/2012 | Kopra | 705/14.58 |
| 8,286,218 | B2* | 10/2012 | Pizzurro et al. | 725/135 |
| 8,373,743 | B2* | 2/2013 | Hearn | 348/14.08 |
| 8,606,073 | B2* | 12/2013 | Woodman | 386/223 |
| 8,631,255 | B2* | 1/2014 | Chew | 713/300 |
| 8,890,925 | B2* | 11/2014 | Weiser et al. | 348/14.08 |
| 2002/0085029 | A1* | 7/2002 | Ghani | 345/751 |
| 2002/0087592 | A1* | 7/2002 | Ghani | 707/500 |
| 2008/0133767 | A1* | 6/2008 | Birrer et al. | 709/231 |
| 2011/0285863 | A1* | 11/2011 | Burke et al. | 348/207.1 |
| 2012/0030053 | A1* | 2/2012 | Feinstein | 705/26.3 |
| 2013/0195168 | A1* | 8/2013 | Singh | 375/240.02 |
| 2013/0298151 | A1* | 11/2013 | Leske et al. | 725/25 |
| 2013/0312041 | A1* | 11/2013 | Gresta | 725/61 |
| 2013/0346226 | A1* | 12/2013 | Nunes | 705/26.2 |
| 2014/0018157 | A1* | 1/2014 | Kern et al. | 463/25 |
| 2014/0018165 | A1* | 1/2014 | Kern et al. | 463/31 |
| 2014/0031121 | A1* | 1/2014 | Kern et al. | 463/33 |
| 2014/0040933 | A1* | 2/2014 | Kopra | 725/14 |

(Continued)

*Primary Examiner* — Gerald Gauthier
(74) *Attorney, Agent, or Firm* — Chapin IP Law, LLC

(57) ABSTRACT

Methods and apparatus, including computer program products, for call-in participation for a live video broadcast. A method includes, in a server residing in a network of interconnected computers, alerting a media player of a call-in feature during a live streaming broadcast, receiving an indication from a viewer of the media player to participate in the live streaming broadcast, receiving audio/video device specifications from the media player, and dispatching an active participant stream to be used in conjunction with the live streaming broadcast.

13 Claims, 4 Drawing Sheets

(56) References Cited

U.S. PATENT DOCUMENTS

| | | | |
|---|---|---|---|
| 2014/0064701 A1* | 3/2014 | Woodman | 386/241 |
| 2014/0101227 A1* | 4/2014 | Bieselt et al. | 709/203 |
| 2014/0160223 A1* | 6/2014 | Bieselt et al. | 348/14.03 |

* cited by examiner

36

Receive a call-in initiation signal from the media player
100

Prompt a viewer of the media player to select a video source and an audio source from the system settings of the second client device
102

Receive a request from the media player to be placed in a call-in queue
104

Manage the incoming call-in streams
106

Select the ones to be on-air
108

Use the signal of the viewer in editorial content
110

Enable production interaction of the viewer with content
112

Terminate the on-air session upon receiving a signal that interaction is complete
114

FIG. 2

CALL-IN PARTICIPATION FOR A LIVE VIDEO BROADCAST

BACKGROUND OF THE INVENTION

The invention generally relates to live streaming and on demand video streaming, and more specifically to call-in participation for a live video broadcast.

According to a common definition of live video streaming, it is "multimedia that is constantly received by and presented to an end-user while being delivered by a streaming provider." In effect, live video streaming is a process of live video broadcast that enables viewers to watch an event online or on mobile devices (e.g., smart phones and tablet computers) and semi-mobile devices (e.g., laptops and desktop computers) in real time.

The use of video streaming is commonly used to deliver video data via the Internet and other networks. Typically, a video server divides a video program into segments, encodes each segment, and transmits the encoded segments via a network to a client device. The client device receives the encoded segments, decodes the segments, and presents the decoded segments in an appropriate sequence to produce a video presentation.

SUMMARY OF THE INVENTION

The following presents a simplified summary of the innovation in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention provides methods and apparatus, including computer program products, for call-in participation for a live video broadcast.

In an aspect, the invention features a method including, in a server residing in a network of interconnected computers, alerting a media player of a call-in feature during a live streaming broadcast, receiving an indication from a viewer of the media player to participate in the live streaming broadcast, receiving audio/video device specifications from the media player, and dispatching an active participant stream to be used in conjunction with the live streaming broadcast.

In another aspect, the invention features a method including, in a server residing in a network of interconnected computers, alerting a plurality of viewers of a call-in feature during a live streaming broadcast, receiving an indication from one or more of the viewers in response to the alerting, receiving system variables from media players of the one or more viewers, receiving viewers' audio/video streams, establishing a bi-directional communication between the one of more viewers and a producer, screening the one or more viewers, and audio mixing selected viewers' audio/video streams and the live streaming broadcast so that the one or more viewers do not hear their own audio signal during the live streaming broadcast.

In another aspect, the invention features, in a server residing in a network of interconnected computers, receiving a call-in initiation request from a media player to participate in a live streaming broadcast, receiving video source and audio source information from system settings of a system hosting the media player, placing the request from the media player in a call-in queue, and mixing audio/video streams from the media player with the live streaming broadcast.

In still another aspect, the invention features a system including a processor, a memory including an operating system and a process for generating a graphical user interface (GUI), the GUI including an information pane displaying a current live streaming broadcast and social sharing functionalities, a plurality of playback controls including a control to pause the live stream, a control to rewind, a control to jump to live time, a control to switch angle, a control to adjust volume and a control to toggle fullscreen, a call-in call to action button, a pane to preview a viewer's video source, a pan displaying selectable sources for audio/video functionality, a pane to preview a viewer's audio input, and a request button through which a viewer can send a request to an operator handling call-ins to be on-air.

Other features and advantages of the invention are apparent from the following description, and from the claims.

BRIEF DESCRIPTION OF THE DRAWINGS

The invention will be more fully understood by reference to the detailed description, in conjunction with the following figures, wherein:

FIG. 2 is a flow diagram.

DETAILED DESCRIPTION

Figure 1:
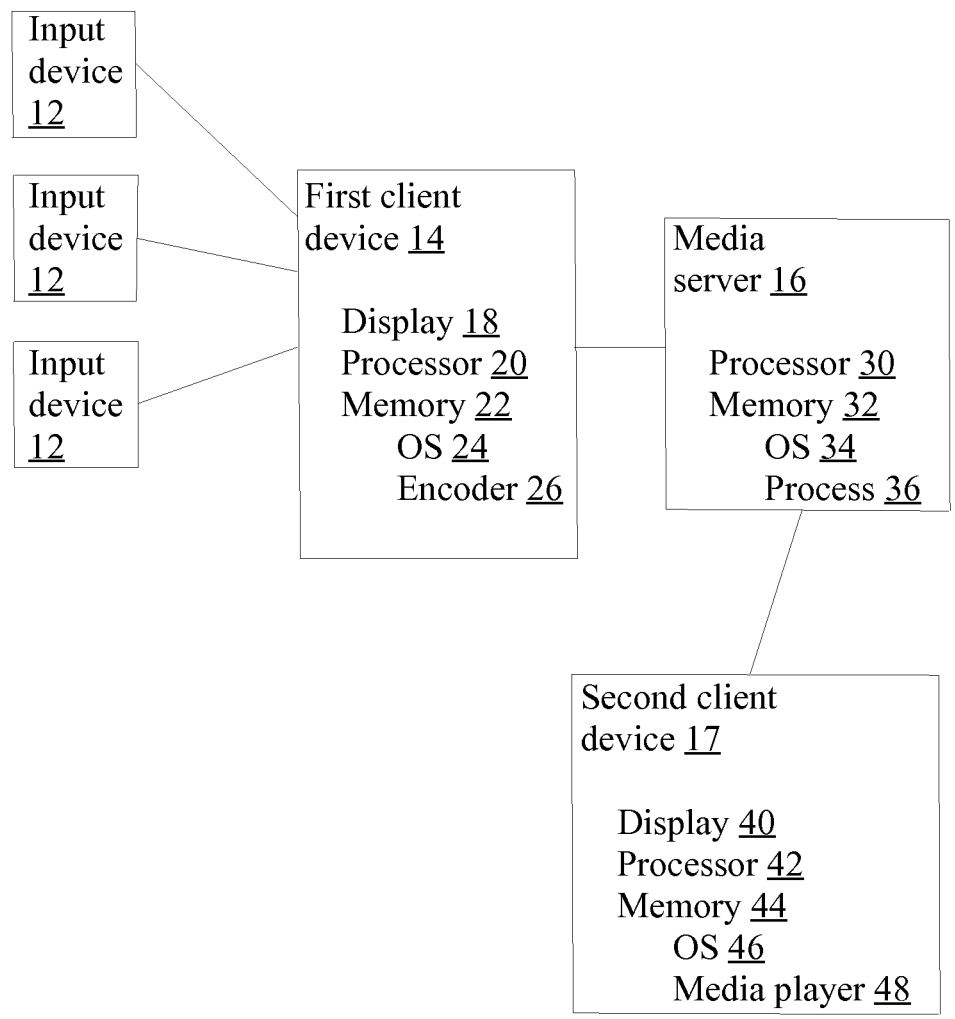
FIG. 1 is a block diagram of an exemplary system.

The subject innovation is now described with reference to the drawings, wherein like reference numerals are used to refer to like elements throughout. In the following description, for purposes of explanation, numerous specific details are set forth in order to provide a thorough understanding of the present invention. It may be evident, however, that the present invention may be practiced without these specific details. In other instances, well-known structures and devices are shown in block diagram form in order to facilitate describing the present invention.

As used in this application, the terms "component," "system," "platform," and the like can refer to a computer-related entity or an entity related to an operational machine with one or more specific functionalities. The entities disclosed herein can be either hardware, a combination of hardware and software, software, or software in execution. For example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

As used herein, a "viewer" refers to a consumer of a broadcast.

A "producer" uses tools, such as cloud based, collaborative and interactive live broadcasting solutions from MakeTV of Germany and incorporated herein by reference, to author a live broadcast.

A "participant" uses a call-in feature to participate in a live show.

A "contributor" uses a contribute feature to contribute media to a live stream.

"Production" refers to the entire process of producing a (live) show.

A "session" refers to a topical entity.

A "channel" groups shows.

A "show" is a single, continuous live or on demand media entity.

An "edit decision list (EDL)" refers to a timeline of a (live) video edit.

"Assets" refer to media elements used in a creation of a show.

"Tag" refers to a non-hierarchical keyword assigned to a piece of information.

The "Internet" refers to a worldwide collection of computer networks, cooperating with each other to exchange data using a common software standard.

Live video streaming, as described above, is a process of transmitting a video signal in real time over a network, such as the Internet, to one or more receiving stations. The receiving stations can be desktop computers, laptop computers, mobile devices, tablet computers, and so forth. Live video streaming often is viewed by a client with a media player. In general, a media player is a software program designed to play multimedia content as it streams in from a network such as the Internet, or from local storage on a hard drive or other resource. A media player might be expected to understand and translate several audio and video codecs, covering many digital music and video formats.

call-in participation is common in other media, such as radio. The content of a broadcast can be enhanced and made more engaging by incorporating an audience into the content of the broadcast. The present invention enables the concept of call-in participation to the field of Internet-based live video streaming.

The present invention may be adapted to a number of applications, such as, for example, game shows, talk shows, town hall style conventions, question and answer (Q&A) scenarios, and so forth.

The present invention is used in conjunction, for example, with an Internet live streaming audience equipped with computer devices having an integrated webcam technology.

In one aspect, the present invention alerts a viewer that a call-in is possible and desirable for a current content of a producer. The viewer signals that they wish to take part in a live streaming event and become a participant. The viewer selects audio/video settings in their media player.

The present invention enables an operator to screen possible participants and an active participant stream is sent to the producer.

In another aspect, the present invention alerts a viewer that call-in is possible. The present invention enables receiving a viewer request to participate in a live streaming event device characteristics of the viewer's system.

The viewer's video streams are transmitted to a broadcasting server and a bi-directional communication established between the viewer and the participant.

A viewer does not hear their own audio signal in live events by audio mixing.

As shown in FIG. 1, an exemplary system 10 includes a number of input devices 12 linked to a first client device 14. The first client device 14 is linked to a media server 16 and the media server 16 is linked to a second client device 17. An example input device 12 is a camera that delivers a continuous input video stream to the first client device 14. Example first client devices 14 include, for example, a computer, a hardware encoding unit, a mobile device, and so forth. Example mobile devices include, for example, tablet computers running Android®, RIM® or iOS®, smartphones, personal data assistants (PDAs), and so forth. Example second client devices 17 include personal computers, laptops, netbooks, tablet computers, smartphones, and so forth.

The first client device 14 is characterized as at least including a display 18, a processor 20 and a memory 22. Memory 22 includes an operating system (OS) 24, such as Windows®, Linux®, Android® or iOS®, and an encoding unit 26. The encoding unit 26 may be implemented in software or hardware and is responsible for receiving a stream of video signals from the input devices 12, encoding the received video stream, and streaming the encoded video to the media server 16. Input streams are associated with a session tag, such as "LiveConcertXY," to generate a topical connection. The session tag is created by an owner with a unique identification (ID).

The media server 16 is characterized by at least including a processor 30 and a memory 32. The memory 32 includes an operating system (OS) 34, such as Windows® or Linux®, and a call-in process 36. A producer (not shown) uses the call-in process 36 to manage received encoded streams from the encoding init 26, i.e., the producer manages the incoming streams and selects the ones that are to be "on-air." Once the selection is made, a call-in stream may be redirected to use as additional input to the live stream edit.

The second client device 17 is characterized as at least including a display 40, a processor 42 and a memory 44. Memory 44 includes an operating system (OS) 46, such as Windows®, Linux®, Android® or iOS®, and a playback device 48 (e.g., media player). The media player 48 receives the live stream from a content delivery network (CDN). To achieve very low latency, the CDN connection is bypassed in a call-in session and a direct connection between the media server 16 and the video stream is established.

As shown in FIG. 2, the call-in process 36 includes receiving (100) a call-in initiation signal from the media player. The process 36 prompts (102) a viewer of the media player to select a video source and an audio source from the system settings of the second client device 17.

Process 36 receives (104) a request from the media player to be placed in a call-in queue.

Process 36 manages (106) the incoming call-in streams and selects (108) the ones to be on-air.

Process 36 uses (110) the signal of the viewer in editorial content and enables (112) production interaction of the viewer with content.

Process 36 terminates (114) the on-air session upon receiving a signal that interaction is complete.

Figure 3:
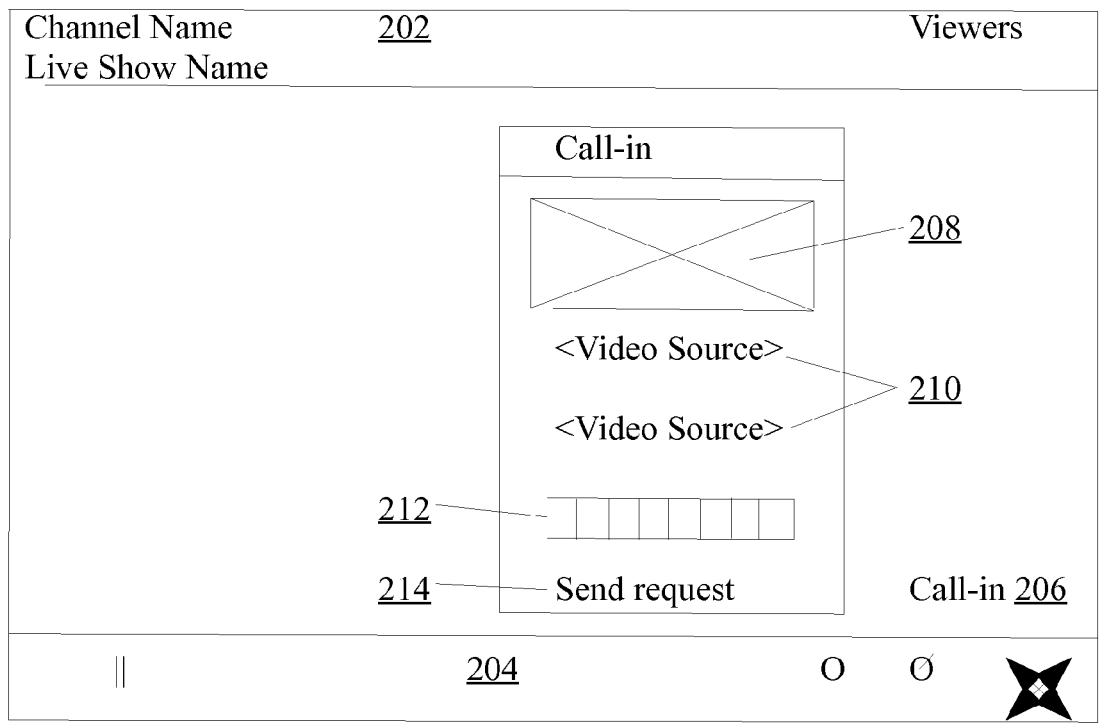
FIG. 3 is an exemplary graphical user interface (GUI).

As shown in FIG. 3, the media player 48 projects a graphical user interface (GUI) 200 to the viewer. The GUI 200 can include information 202 about the current live stream event as well as social sharing functionalities.

Playback controls 204 can include a control to pause the live stream, a control to rewind, a control to jump to live time, a control to switch angle, a control to adjust volume and a control to toggle fullscreen.

A call-in call to action button 206 appears once the producer activates a call-in functionality for a given live stream event.

The GUI 200 includes pane 208 to preview a viewer's video source.

The GUI 200 includes selectable sources 210 for audio/video functionality.

The GUI 200 includes pane 212 to preview a viewer's audio input.

The GUI 200 includes a request button 214 through which a viewer can send a request to an operator handling the call-ins to be on-air.

Figure 4:
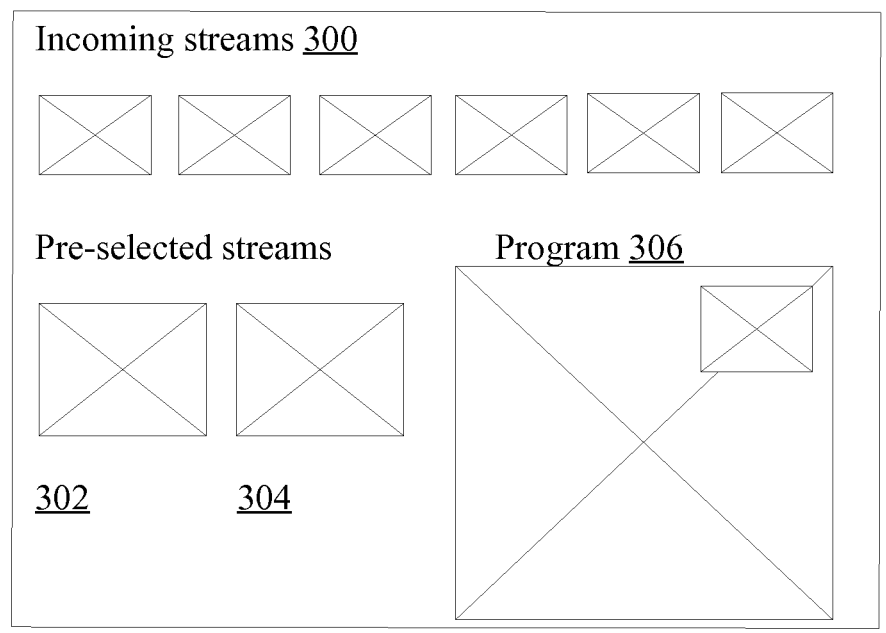
FIG. 4 is a block diagram.

As shown in FIG. 4, all incoming call-in streams 300 are displayed as a lower frame rate and quality to insure simultaneous display of inputs. An operator can manually remove inputs from this area.

A preselected viewer call-in 302 is used on-air by the producer. The operator can talk directly with this viewer with an established two-way audio (video) communication.

A standby viewer call-in stream 304 is the call-in stream that is next in line once the other option drops.

A pane 306 presents a preview of the currently airing program.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" and "computer-readable medium" refer to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback), and input from the user can be received in any form, including acoustic, speech, or tactile input.

The systems and techniques described here can be implemented in a computing system that includes a back-end component (e.g., a data server), or that includes a middleware component (e.g., an application server), or that includes a front-end component (e.g., a client computer having a graphical user interface or a web browser through which a user can interact with an implementation of the systems and techniques described here), or any combination of such back-end, middleware, or front-end components. The components of the system can be interconnected by any form or medium of digital data communication (e.g., a communication network). Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

The foregoing description does not represent an exhaustive list of all possible implementations consistent with this disclosure or of all possible variations of the implementations described. A number of implementations have been described. Nevertheless, it will be understood that various modifications may be made without departing from the spirit and scope of the systems, devices, methods and techniques described here. For example, various forms of the flows shown above may be used, with steps re-ordered, added, or removed. Accordingly, other implementations are within the scope of the following claims.

What is claimed is:

1. A method comprising:
in a server residing in a network of interconnected computers, alerting a media player of a call-in feature during a live streaming broadcast;
receiving an indication from a viewer of the media player to participate in the live streaming broadcast;
receiving audio/video device specifications from the media player; and
dispatching an active participant stream to be used in conjunction with the live streaming broadcast.

2. The method of claim 1 wherein the viewer is a consumer of the live streaming broadcast.

3. The method of claim 1 wherein the live streaming broadcast comprises a transmission of a plurality of video signals in real time over the network to one or more media players.

4. The method of claim 1 wherein the media player a media player is a software program designed to play multimedia content as it streams in from the network.

5. A method comprising:
in a server residing in a network of interconnected computers, alerting a plurality of viewers of a call-in feature during a live streaming broadcast;
receiving an indication from one or more of the viewers in response to the alerting;
receiving system variables from media players of the one or more viewers;
receiving viewers' audio/video streams;
establishing a bi-directional communication between the one of more viewers and a producer;
screening the one or more viewers; and
audio mixing selected viewers' audio/video streams and the live streaming broadcast so that the one or more viewers do not hear their own audio signal during the live streaming broadcast.

6. The method of claim 5 wherein the live streaming broadcast comprises a transmission of a plurality of video signals in real time over the network to the media players of the one or more viewers.

7. The method of claim 5 wherein the one or more viewers are consumers of the live streaming broadcast.

8. The method of claim 5 wherein the producer uses tools to author the live streaming broadcast.

9. A method comprising:

in a server residing in a network of interconnected computers, receiving a call-in initiation request from a media player to participate in a live streaming broadcast;

receiving video source and audio source information from system settings of a system hosting the media player;

placing the request from the media player in a call-in queue; and mixing audio/video streams from the media player with the live streaming broadcast.

10. The method of claim 9 wherein the live streaming broadcast comprises a transmission of a plurality of video signals in real time over the network to the media player.

11. A system comprising:

a processor;

a memory comprising an operating system and a process for generating a graphical user interface (GUI), the GUI comprising:

an information pane displaying a current live streaming broadcast and social sharing functionalities;

a plurality of playback controls including a control to pause the live stream, a control to rewind, a control to jump to live time, a control to switch angle, a control to adjust volume and a control to toggle fullscreen;

a call-in call to action button;

a pane to preview a viewer's video source;

a pane displaying selectable sources for audio/video functionality;

a pane to preview a viewer's audio input; and a request button through which a viewer can send a request to an operator handling call-ins to be on-air.

12. The system of claim 11 wherein the viewer is a consumer of the live streaming broadcast.

13. The system of claim 11 wherein the live streaming broadcast comprises a transmission of a plurality of video signals in real time over a network.

* * * * *